(12) United States Patent
Sakai

(10) Patent No.: US 9,170,272 B2
(45) Date of Patent: Oct. 27, 2015

(54) SCANNING MECHANISM AND SCANNING PROBE MICROSCOPE

(71) Applicant: OLYMPUS CORPORATION, Tokyo (JP)

(72) Inventor: Nobuaki Sakai, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 14/505,942

(22) Filed: Oct. 3, 2014

(65) Prior Publication Data

US 2015/0020243 A1    Jan. 15, 2015

Related U.S. Application Data

(63) Continuation of application No. PCT/JP2012/059249, filed on Apr. 4, 2012.

(51) Int. Cl.
G01Q 10/00 (2010.01)
G01Q 20/02 (2010.01)
G01Q 10/04 (2010.01)

(52) U.S. Cl.
CPC ............... *G01Q 10/00* (2013.01); *G01Q 10/04* (2013.01); *G01Q 20/02* (2013.01)

(58) Field of Classification Search
USPC .......................................................... 850/6, 5
See application file for complete search history.

(56) References Cited

U.S. PATENT DOCUMENTS

| 5,825,020 | A | 10/1998 | Hansma et al. |
| 6,018,991 | A | 2/2000 | Nakano |
| 6,246,054 | B1 | 6/2001 | Toda et al. |
| 2011/0055982 | A1* | 3/2011 | Watanabe et al. .......... 850/2 |

FOREIGN PATENT DOCUMENTS

| JP | 05288973 A | 11/1993 |
| JP | 08278317 A | 10/1996 |
| JP | 11230971 A | 8/1999 |
| JP | 11281865 A | 10/1999 |
| JP | 11-344500 A | 12/1999 |
| JP | 2000-517433 A | 12/2000 |
| JP | 2003240700 A | 8/2003 |
| JP | 2007218707 A | 8/2007 |

(Continued)

OTHER PUBLICATIONS

English translation of International Preliminary Report on Patentability together with the Written Opinion dated Oct. 16, 2014 received in related International Application No. PCT/JP2012/059249.

(Continued)

*Primary Examiner* — Kiet T Nguyen
(74) *Attorney, Agent, or Firm* — Scully, Scott, Murphy & Presser, P.C.

(57) ABSTRACT

A scanning mechanism includes a cantilever, an XY movable portion movable in X and Y directions parallel to an X-Y plane, an XY actuator to scan the XY movable portion in the X and Y directions, a Z actuator to scan the cantilever in a Z direction perpendicular to the X-Y plane, and a light condensing portion to cause light for detecting a displacement of the cantilever to enter the cantilever. The Z actuator and the light condensing portion are held by the XY movable portion and arranged side by side in projection to the X-Y plane.

24 Claims, 12 Drawing Sheets

(56) References Cited

FOREIGN PATENT DOCUMENTS

| JP | 2010-521693 A | 6/2010 |
| JP | 2010-190657 A | 9/2010 |

OTHER PUBLICATIONS

Japanese Office Action dated Jan. 27, 2015 with English translation received in related Patent Application No. 2011-049104.

English Abstract of WO 2008/115862 A2, dated Sep. 25, 2008.
International Search Report dated Jun. 26, 2012 issued in PCT/JP2012/059249.
Japanese Office Action dated Aug. 18, 2015 from related Japanese Patent Application No. 2011-049104, together with an English language translation.

* cited by examiner

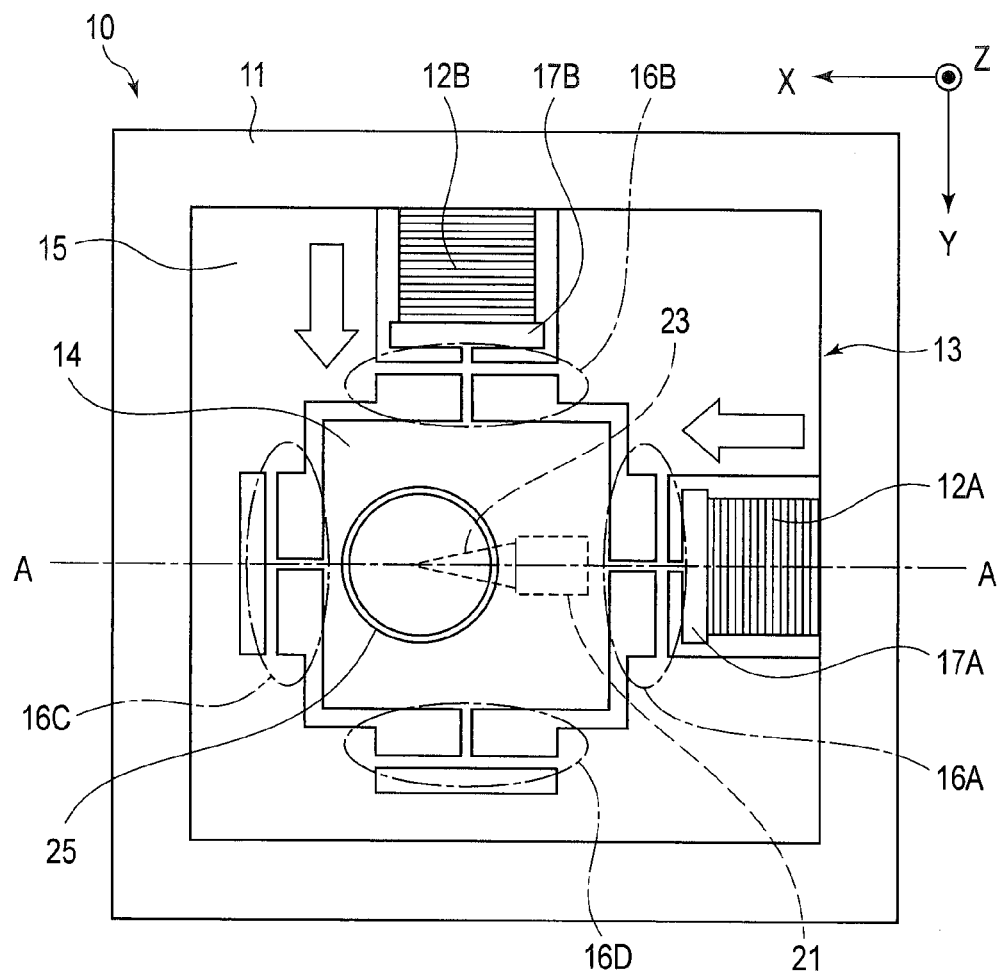
F I G. 1
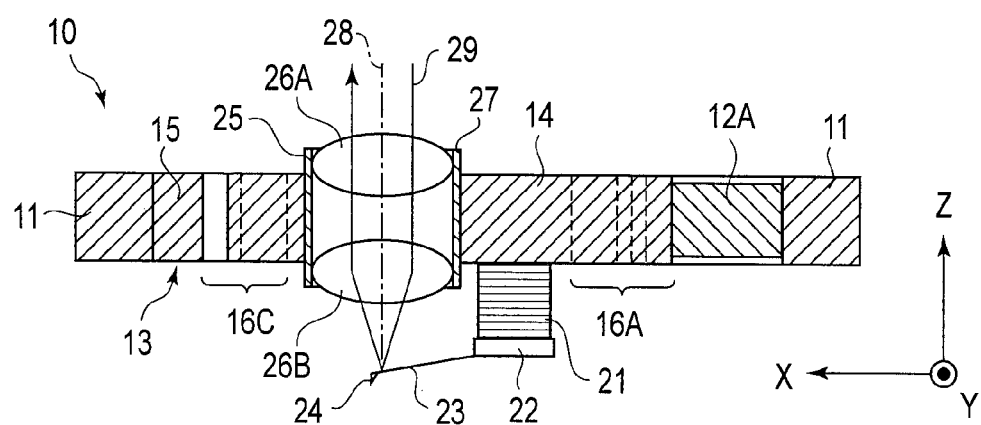
F I G. 2

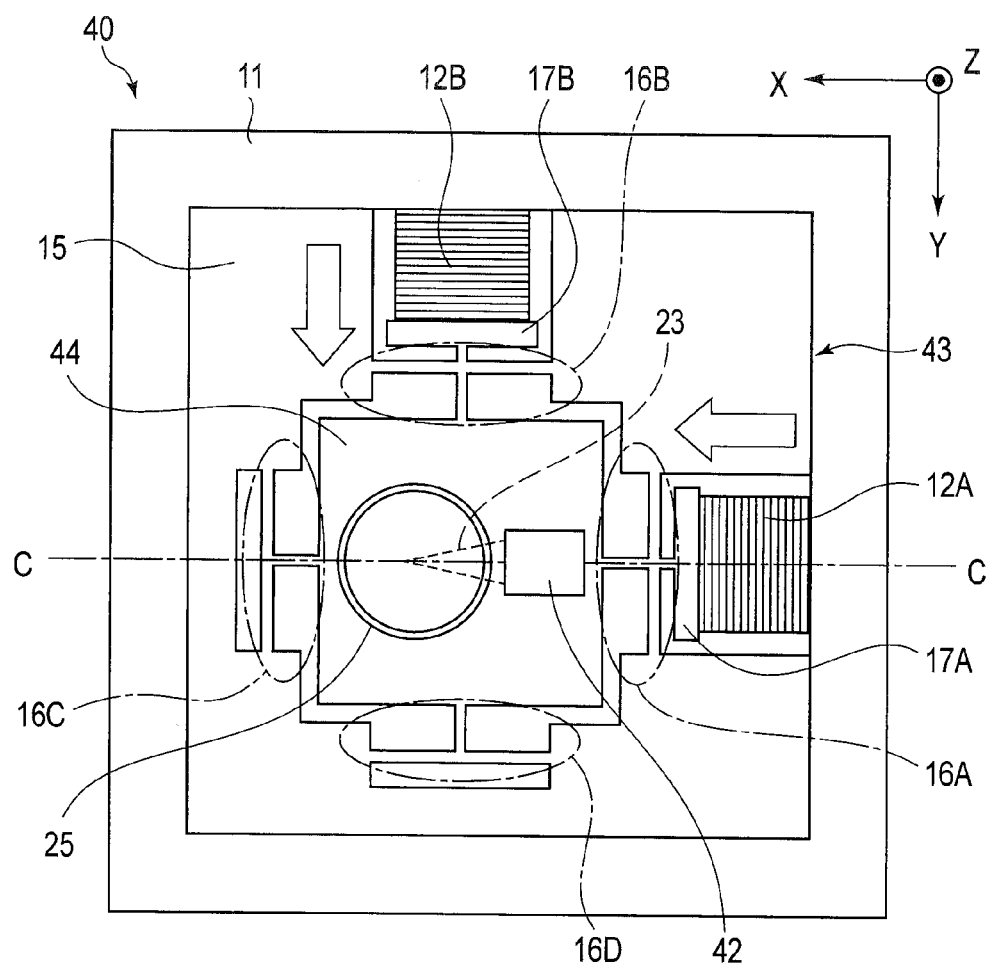
F I G. 5
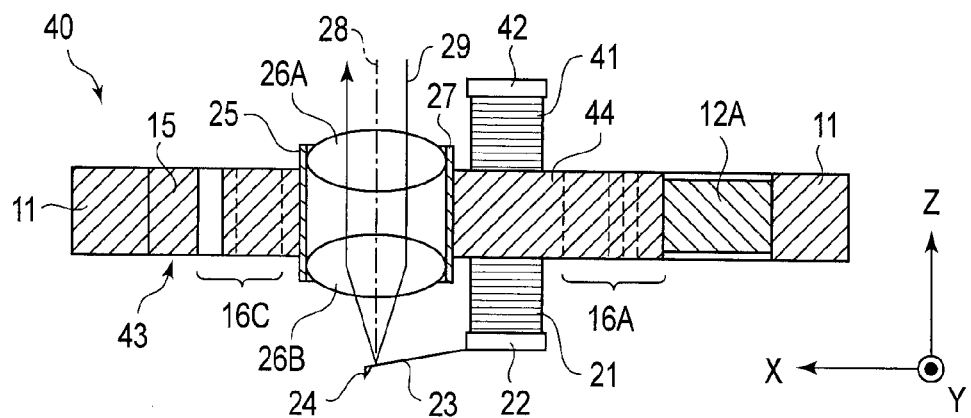
F I G. 6

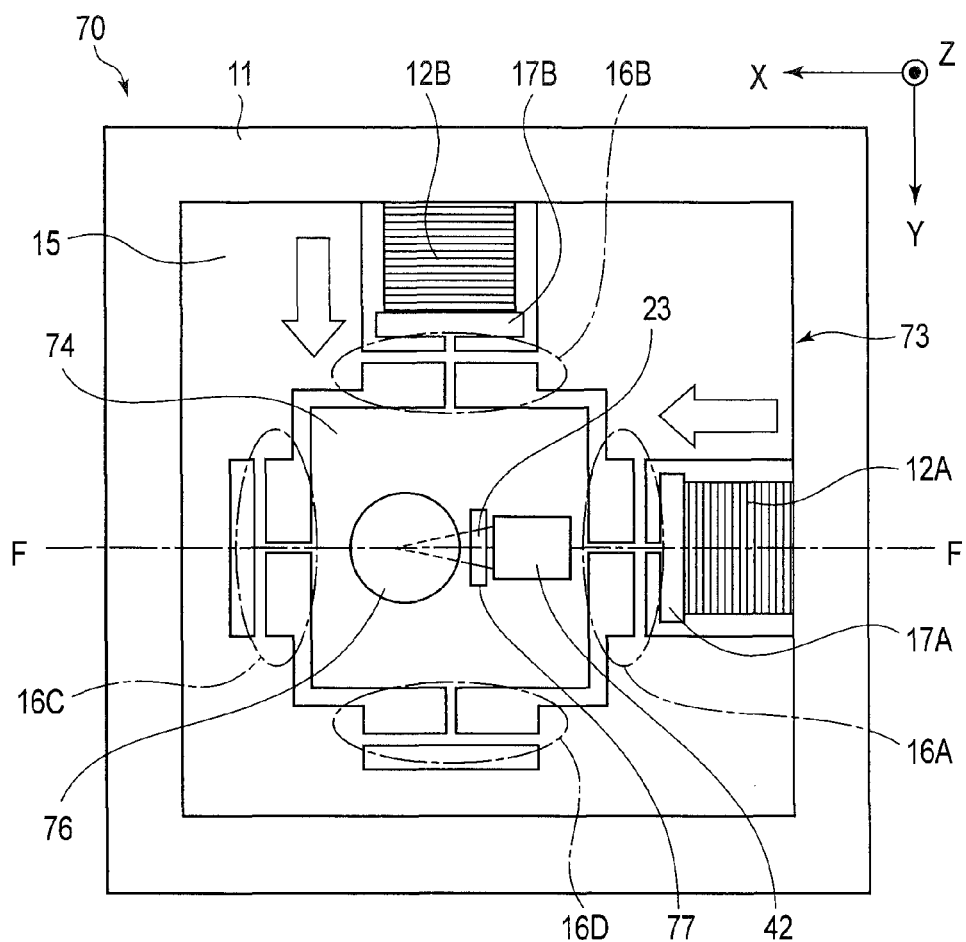
F I G. 12
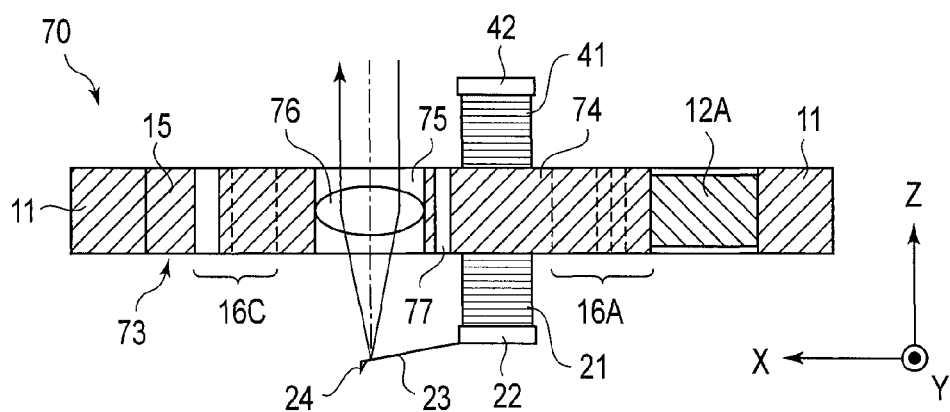
F I G. 13

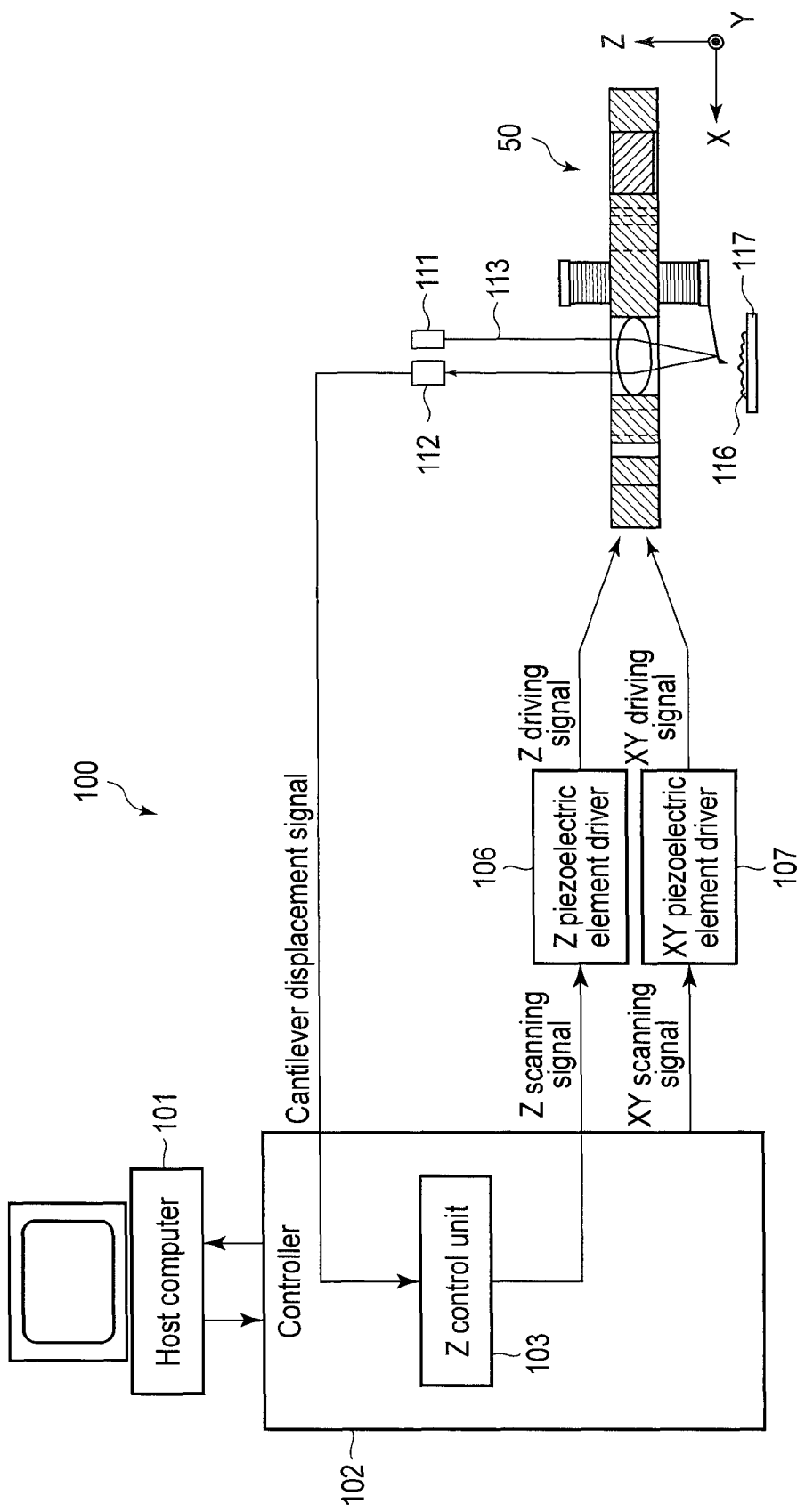
F I G. 17

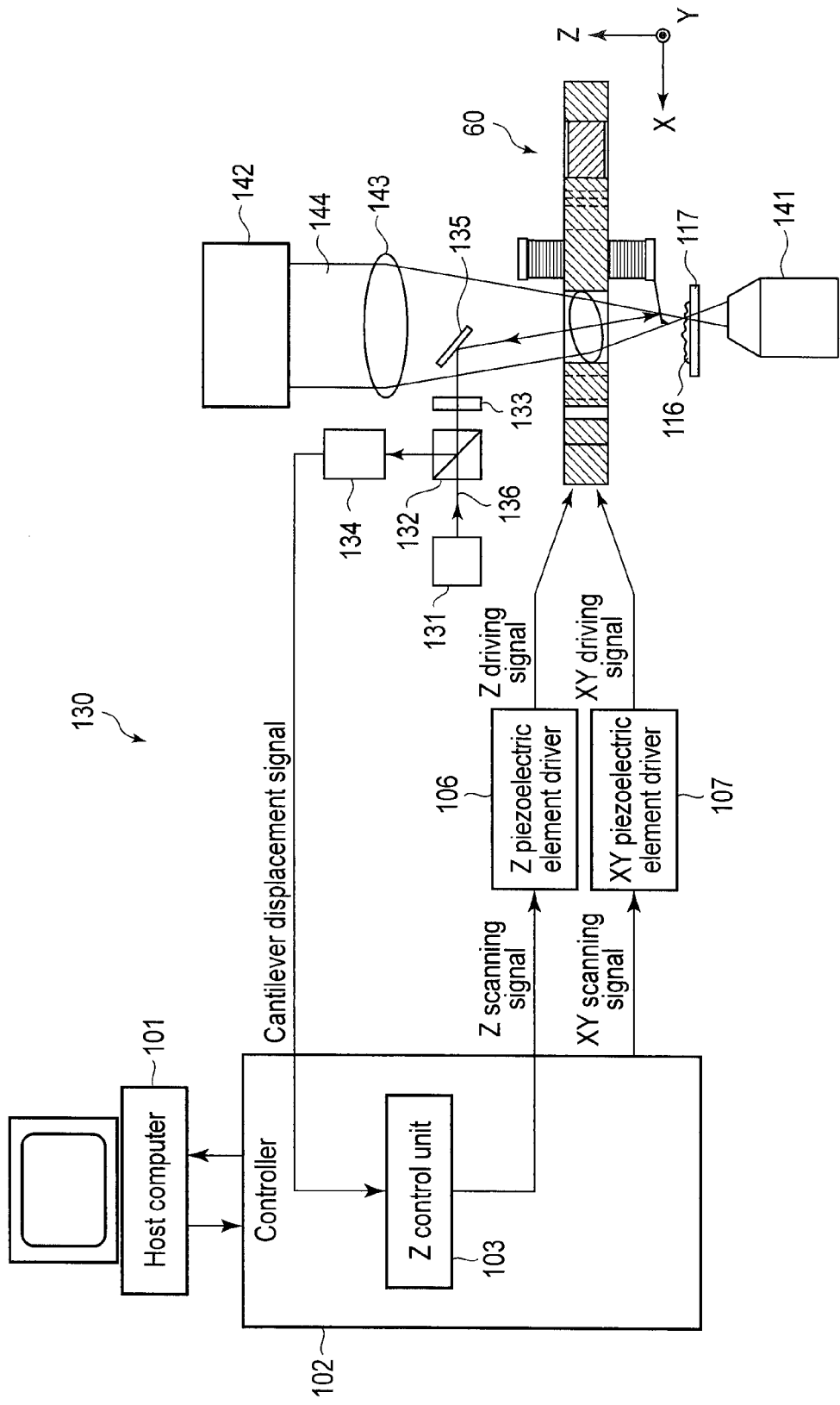
F I G. 19

SCANNING MECHANISM AND SCANNING PROBE MICROSCOPE

CROSS-REFERENCE TO RELATED APPLICATIONS

This application is a Continuation Application of PCT Application No. PCT/JP2012/059249, filed Apr. 4, 2012.

BACKGROUND OF THE INVENTION

1. Field of the Invention

The present invention relates to a scanning probe microscope.

2. Description of the Related Art

A scanning probe microscope (SPM) is a scanning microscope that mechanically scans a mechanical probe by a scanning mechanism to obtain information of a sample surface. The scanning probe microscope is a generic term for a scanning tunneling microscope (STM), an atomic force microscope (AFM), a scanning magnetic force microscope (MFM), a scanning near field optical microscope (SNOM), and the like. The scanning probe microscope raster scans the mechanical probe and a sample relatively in the X and Y directions to obtain surface information of a desired sample region through the mechanical probe, and map and display it on a monitor TV.

Above all, the AFM is a most popular apparatus, and includes, as main machine mechanisms, a cantilever having a mechanical probe at its free end, an optical displacement sensor to detect the displacement of the cantilever, and a scanning mechanism to relatively scan the mechanical probe and a sample. As the optical displacement sensor, an optical lever type optical displacement sensor is employed most widely because of its simple arrangement and high displacement detection sensitivity. The optical lever type optical displacement sensor applies a beam having a diameter of several µm to several ten µm to a cantilever. A change in the reflection direction of the reflected beam depending on the warp of the lever is detected by a two-segments detector or the like. The operation of the mechanical probe at the free end of the cantilever is detected and output as an electrical signal. While the scanning mechanism is controlled in the Z direction to keep this output constant, the scanning mechanism is similarly scanned in the X and Y directions to map and display the uneven state of a sample surface on the monitor of a computer.

When observing a biological sample in a liquid, the AFM is generally combined with an inverted optical microscope. This is because the inverted optical microscope observation is effective not only when obtaining the finding of a sample, but also when positioning the cantilever at a specific portion of the sample. The AFM often uses a lever scan type scanning mechanism to scan the cantilever in the X, Y, and Z directions so as to cope with various biological samples and sample substrates.

A sample scan type biological AFM to scan a sample in the X, Y, and Z directions has problems: simultaneous observation by the inverted optical microscope is impossible, and there are many constraints on a sample or a sample substrate. However, the AFM has attracted attention because the motion of a living biological sample in a liquid can be observed at a high resolution. When observing the motion of a biological sample, the observation speed is important in the AFM. For this application, the goal is to obtain one frame within 1 sec, and desirably within 0.1 sec. To increase the speed of the AFM, the machine mechanism is challenging because the electrical circuit of the AFM has already reached a possible level even in an apparatus commercially available at present. Such machine mechanisms are particularly a scanning mechanism having a high scanning speed, a flexible cantilever having a high resonance frequency, and an optical lever type optical displacement sensor capable of detecting the displacement of the cantilever.

For example, when an image of 100 pixels in the X direction and 100 pixels the Y direction is captured in 0.1 sec, the scanning frequencies in the X, Y, and Z directions that are requested of the scanning mechanism reach 1 kHz, 10 Hz, and 100 kHz or more, respectively.

The high-frequency cantilever suited to observe a biological sample requires a spring constant of 1 N/m or less and a resonance frequency of 300 kHz or more. The dimensions of such a cantilever are as small as approximately 1/10 of the dimensions of a cantilever commercially available at present. For example, a cantilever made of silicon nitride has a length of 10 µm, a width of 2 µm, and a thickness of 0.1 µm. The spring constant is 0.1 N/m, the resonance frequency in air is 1.2 MHz, and the resonance frequency in a liquid is approximately 400 kHz.

Further, the optical displacement sensor requires a light condensing optical system to change the spot diameter of convergent light to be equal to or smaller than several µm in order to detect the displacement of a very small cantilever.

As described above, it is desirable that high speed observation of a biological sample by the AFM can be combined with inverted optical microscope observation, that is, the AFM is of the lever scan type. It is necessary that the AFM can use a flexible cantilever having a high resonance frequency, and includes a scanning mechanism to allow high speed scanning.

BRIEF SUMMARY OF THE INVENTION

A scanning mechanism according to the present invention includes a cantilever, an XY movable portion movable in X and Y directions parallel to an X-Y plane, an XY actuator to scan the XY movable portion in the X and Y directions, a Z actuator to scan the cantilever in a Z direction perpendicular to the X-Y plane, and a light condensing portion to cause light for detecting a displacement of the cantilever to enter the cantilever. The Z actuator and the light condensing portion are held by the XY movable portion and arranged side by side in projection to the X-Y plane.

Advantages of the invention will be set forth in the following description, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

FIG. 1 is a plan view of a scanning mechanism according to the first embodiment.

FIG. 2 is a sectional view of the scanning mechanism taken along a line A-A in FIG. 1.

FIG. 5 is a plan view of a scanning mechanism as a modification of the second embodiment.

FIG. 6 is a sectional view of the scanning mechanism taken along a line C-C in FIG. 5.

FIG. 12 is a plan view of a scanning mechanism according to the third embodiment.

FIG. 13 is a sectional view of the scanning mechanism taken along a line F-F in FIG. 12.

FIG. 17 shows a scanning probe microscope according to the fourth embodiment.

FIG. 19 shows a scanning probe microscope according to the fifth embodiment.

DETAILED DESCRIPTION OF THE INVENTION

Figure 3:
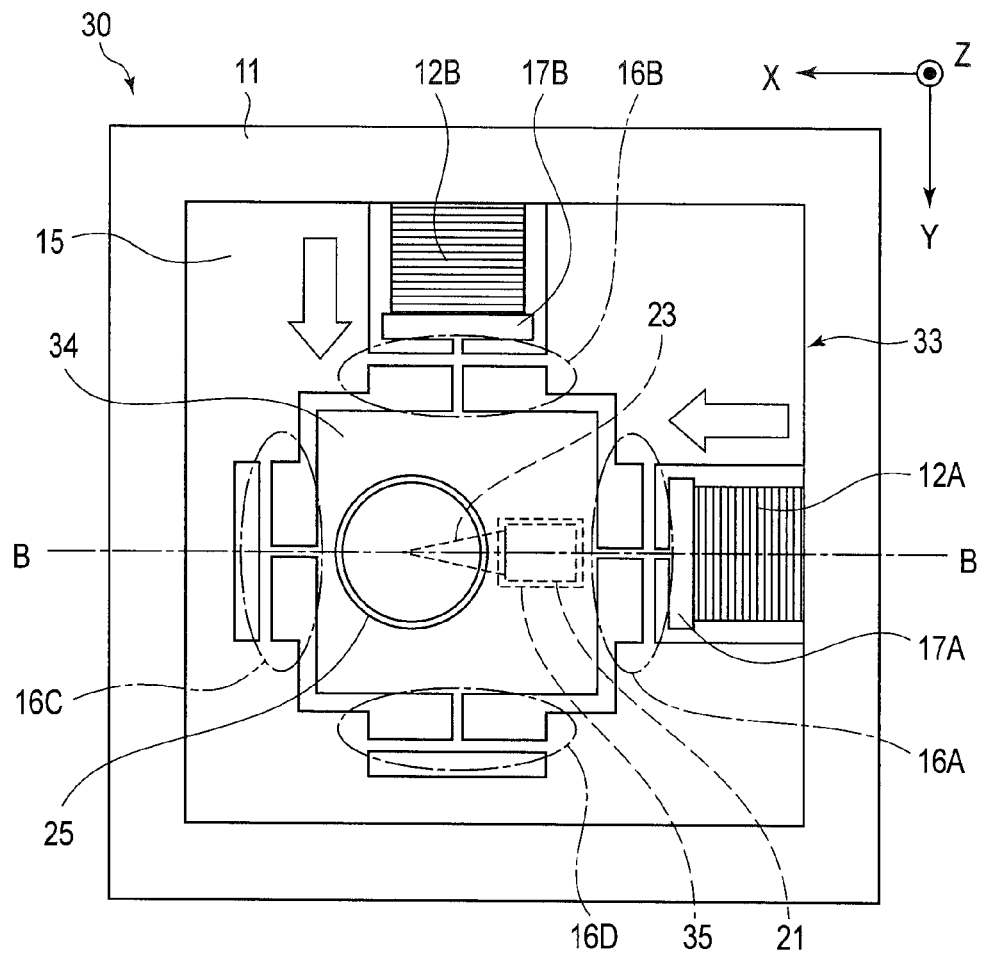
FIG. 3 is a plan view of a scanning mechanism according to the second embodiment.

Embodiments of the present invention will now be described with reference to the accompanying drawings.

First Embodiment

The first embodiment is directed to a scanning mechanism. The first embodiment will be described with reference to FIGS. 1 and 2. FIG. 1 is a plan view of the scanning mechanism according to the first embodiment. FIG. 2 is a sectional view of the scanning mechanism taken along a line A-A in FIG. 1.

As shown in FIGS. 1 and 2, a scanning mechanism 10 according to the first embodiment includes a fixing frame 11, an XY stage 13 located within the fixing frame 11, a piezoelectric element 12A located between the XY stage 13 and the fixing frame 11 and extending along the X axis, and a piezoelectric element 12B located between the XY stage 13 and the fixing frame 11 and extending along the Y axis.

The XY stage 13 includes an XY movable portion 14 movable along the X and Y axes perpendicular to each other (that is, in the X and Y directions parallel to an X-Y plane including the X and Y axes), elastic portions 16A and 16C arranged on two sides of the XY movable portion 14 along the X axis, elastic portions 16B and 16D arranged on two sides of the XY movable portion 14 along the Y axis, and a support portion 15 supporting the elastic portions 16A to 16D.

The support portion 15 of the XY stage 13 is positioned on the two sides of the piezoelectric element 12A, elastic portion 16A, and elastic portion 16C along the Y axis. In other words, the support portion 15 of the XY stage 13 is positioned on the two sides of the piezoelectric element 12B, elastic portion 16B, and elastic portion 16D along the X axis. The support portion 15 is fixed to the fixing frame 11. The fixation of the support portion 15 is not limited to this, and the support portion 15 is fixed by, e.g., screwing or bonding.

The elastic portions 16A and 16B have completely the same shape except that their orientations are different. Both of the elastic portions 16A and 16B have a cross shape. The elastic portions 16C and 16D have completely the same shape except that their orientations are different. Both of the elastic portions 16C and 16D have a T shape. The elastic portion 16A positioned on the side of the piezoelectric element 12A has a press portion 17A to be pressed by the piezoelectric element 12A. The elastic portion 16B positioned on the side of the piezoelectric element 12B has a press portion 17B to be pressed by the piezoelectric element 12B.

Each of the elastic portions 16A and 16C has a rectangular plate like portion spreading on the Z X plane and elongated along the X axis, and a rectangular plate like portion spreading on the Y Z plane and elongated along the Y axis. The rectangular plate like portion elongated along the X axis has one end portion along the X axis that is connected to the XY movable portion 14, and has one end portion along the X axis that is connected to the center portion of the rectangular plate like portion elongated along the Y axis. The rectangular plate like portion elongated along the Y axis has two end portions along the Y axis that are connected to the support portion 15.

Each of the elastic portions 16B and 16D has a rectangular plate like portion spreading on the Y Z plane and elongated along the Y axis, and a rectangular plate like portion spreading on the Z X plane and elongated along the X axis. The rectangular plate like portion elongated along the Y axis has one end portion along the Y axis that is connected to the XY movable portion 14, and has one end portion along the Y axis that is connected to the center portion of the rectangular plate like portion elongated along the X axis. The rectangular plate like portion elongated along the X axis has two end portions along the X axis that are connected to the support portion 15. The thickness of these plate like portions, that is, the dimension along the Z axis is equal to, but not limited to, e.g., the thickness of the XY movable portion 14.

With this shape, the elastic portions 16A and 16C are readily elastically deformed along the Y axis, but are hardly deformed along the X axis. The elastic portions 16B and 16D are readily elastically deformed along the X axis, but are hardly deformed along the Y axis. Thus, the XY movable portion 14 is supported by the elastic portions 16A and 16C at high rigidity along the X axis, and is supported by the elastic portions 16B and 16D at high rigidity along the Y axis.

The XY stage 13 is formed integrally. That is, the XY movable portion 14, support portion 15, elastic portions 16A to 16D, and press portions 17A and 17B are formed integrally. The XY stage 13 is fabricated by selectively notching, e.g., a metal block made of aluminum.

The material of the fixing frame 11 preferably has a higher elastic modulus than that of the material of the XY stage 13. For example, the fixing frame 11 is made of stainless steel, and the XY stage 13 is made of aluminum.

The piezoelectric element 12A is so arranged as to apply a predetermined preload between the press portion 17A of the elastic portion 16A and the fixing frame 11. The piezoelectric element 12B is so arranged as to apply a predetermined preload between the press portion 17B of the elastic portion 16B and the fixing frame 11.

The piezoelectric element 12A is arranged so that a straight line passing through the center of gravity of the XY movable portion 14 and parallel to the X axis passes through the center of the piezoelectric element 12A. The piezoelectric element 12B is arranged so that a straight line passing through the center of gravity of the XY movable portion 14 and parallel to the Y axis passes through the center of the piezoelectric element 12B.

The piezoelectric element 12A is an X actuator for moving the XY movable portion 14 through the elastic portion 16A along the X axis. The piezoelectric element 12A can expand and contract along the X axis in accordance with application of a voltage. The piezoelectric element 12B is a Y actuator for moving the XY movable portion 14 through the elastic portion 16B along the Y axis. The piezoelectric element 12B can expand and contract along the Y axis in accordance with application of a voltage.

The piezoelectric elements 12A and 12B are constituted by, e.g., two, substantially identical laminated piezoelectric elements. The piezoelectric elements 12A and 12B constitute an XY actuator to scan the XY movable portion 14 in a direction parallel to the X-Y plane.

The scanning mechanism 10 includes a piezoelectric element 21 held by the XY movable portion 14, a holder 22 held by the piezoelectric element 21, and a cantilever 23 held by the holder 22. The piezoelectric element 21 has one end fixed to the XY movable portion 14, and extends in the −Z direction. The holder 22 to hold the cantilever 23 is held at the free end of the piezoelectric element 21. The piezoelectric element 21 is constituted by, e.g., a laminated piezoelectric element. The piezoelectric element 21 can expand and contract along the Z axis in accordance with application of a voltage. The piezoelectric element 21 constitutes a Z actuator to scan the cantilever 23 in the Z axis direction perpendicular to the X-Y plane. The cantilever 23 includes a mechanical probe 24 at the free end of the cantilever 23. The cantilever 23 extends along, e.g., the X axis. The cantilever 23 may be attached to the holder 22 to be exchangeable.

The scanning mechanism 10 further includes a light condensing portion 25 held by the XY movable portion 14. The light condensing portion 25 operates so as to cause light emitted from a cantilever optical displacement sensor, not shown, e.g., an optical lever sensor for detecting the displacement of the cantilever 23 to enter the cantilever 23. The light condensing portion 25 includes, but not limited to, e.g., two condensing lenses 26A and 26B. The condensing lenses 26A and 26B are held by a cylinder 27 extending through the XY movable portion 14.

The piezoelectric element 21 and light condensing portion 25 are arranged side by side in projection to the X-Y plane. In other words, one of the piezoelectric element 21 and light condensing portion 25 is positioned outside the other without overlapping each other on the projected X-Y plane. The piezoelectric element 21 and light condensing portion 25 are not limited to this, and are arranged side by side in, e.g., a direction in which the cantilever 23 extends, i.e., along the X axis.

In the scanning mechanism 10 having this arrangement, the piezoelectric element 12A expands and contracts along the X axis at the time of scanning in the X direction. When the piezoelectric element 12A expands, the piezoelectric element 12A presses the XY movable portion 14 while elastically deforming the elastic portion 16A. The XY movable portion 14 is moved in one direction along the X axis. Along with this, the elastic portion 16C is pressed by the XY movable portion 14 and elastically deformed. Further, the elastic portions 16B and 16D are also pulled in the moving direction of the XY movable portion 14, and are elastically deformed. When the piezoelectric element 12A contracts, the XY movable portion 14 is moved in an opposite direction along the X axis in accordance with the restoring forces of all the elastically deformed elastic portions 16A to 16D. In this manner, the XY movable portion 14 is scanned with high rectilinear propagation in the X direction.

Similarly, at the time of scanning in the Y direction, the piezoelectric element 12B expands and contracts along the Y axis. When the piezoelectric element 12B expands, the piezoelectric element 12B presses the XY movable portion 14 while elastically deforming the elastic portion 16B. The XY movable portion 14 is moved in one direction along the Y axis. Along with this, the elastic portion 16D is pressed by the XY movable portion 14 and elastically deformed. The elastic portions 16A and 16C are also pulled in the moving direction of the XY movable portion 14, and are elastically deformed. When the piezoelectric element 12B contracts, the XY movable portion 14 is moved in an opposite direction along the Y axis in accordance with the restoring forces of all the elastically deformed elastic portions 16A to 16D. In this manner, the XY movable portion 14 is scanned with high rectilinear propagation in the Y direction.

Since the central axis of each of the piezoelectric elements 12A and 12B passes through the center of gravity of the XY movable portion 14, even when the XY movable portion 14 is moved at high speed, a rotational motion by an inertial force hardly occurs. For this reason, the XY movable portion 14 can be scanned in the X and Y directions at high speed with high rectilinear propagation.

When the XY movable portion 14 is scanned in the X and Y directions, the cantilever 23 is also scanned in the X and Y directions together with the piezoelectric element 21. Therefore, the cantilever 23 is also scanned at high speed with high rectilinear propagation.

When the XY movable portion 14 is scanned in the X and Y directions, the light condensing portion 25 is also scanned in the X and Y directions. Hence, the light condensing portion 25 is scanned at high speed with high rectilinear propagation.

A collimated laser beam 29 emitted by the optical lever sensor, not shown, enters the light condensing portion 25 parallel to an optical axis 28 of the light condensing portion 25. The light condensing portion 25 condenses the entering laser beam 29 at the free end of the cantilever 23 to apply it onto the free end. The laser beam 29 reflected by the free end of the cantilever 23 passes through the light condensing portion 25, and enters a photodetector, not shown.

When the XY movable portion 14 is scanned in the X and Y directions, the focus position of the light condensing portion 25 is also scanned in the X and Y directions by the same distance together with the light condensing portion 25. The condensed spot of the laser beam 29 condensed by the light condensing portion 25 is also scanned in the X and Y directions by the same distance as that of the light condensing portion 25. Thus, the condensed spot of the laser beam 29 that is formed by the light condensing portion 25 is scanned in the X and Y directions at high speed with high rectilinear propagation.

Accordingly, in the scanning mechanism 10, the cantilever 23, and the condensed spot of the laser beam 29 that is formed by the light condensing portion 25 are scanned by the same distances in the X and Y directions at high speed with high rectilinear propagation.

In the scanning mechanism 10, the light condensing portion 25 and piezoelectric element 21 are arranged side by side along the X axis in projection to the X-Y plane. The length of the XY movable portion 14 including the light condensing portion 25 and piezoelectric element 21 along the Z axis is suppressed to be short. This reduces "swing vibrations of the XY movable portion 14 arising from an inertial force" generated when the XY movable portion 14 is scanned in the X and Y directions at high speed. Since the cantilever 23 comes close to an X-Y plane passing through the center of gravity of the XY movable portion 14, an increase in swing vibrations of the cantilever 23 is also prevented.

In the scanning mechanism 10, the cantilever 23 and the condensed spot of the laser beam 29 that is formed by the light condensing portion 25 are scanned by the same distances in the X and Y directions at high speed with high rectilinear propagation. The first embodiment provides a detected light follow up type scanning mechanism in which vibration noise arising from an inertial force generated upon scanning in the X and Y directions is reduced. As a result, the first embodiment provides a high speed, high precision detected light follow up type scanning mechanism with high rectilinear propagation.

Second Embodiment

Figure 4:
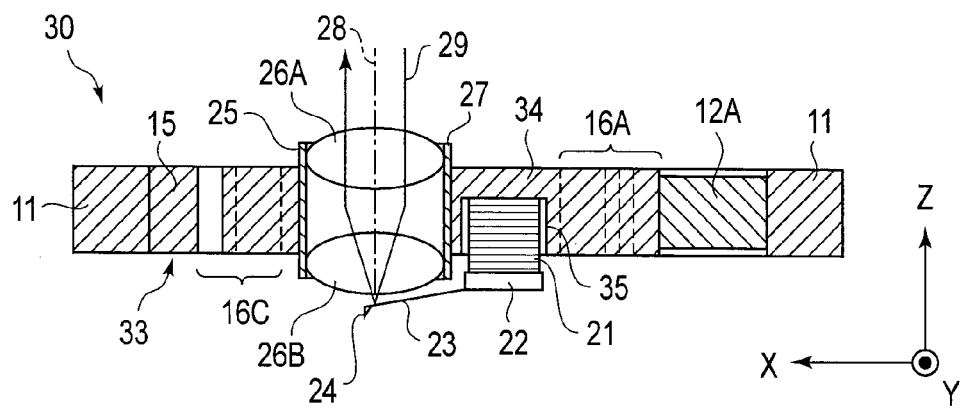
FIG. 4 is a sectional view of the scanning mechanism taken along a line B-B in FIG. 3.

The second embodiment is directed to a scanning mechanism. The second embodiment will be described with reference to FIGS. 3 and 4. FIG. 3 is a plan view of a scanning mechanism 30 according to the second embodiment. FIG. 4 is a sectional view of the scanning mechanism 30 taken along a line B-B in FIG. 3. In FIGS. 3 and 4, the same reference numerals as those shown in FIGS. 1 and 2 denote the same parts, and a detailed description thereof will not be repeated.

As shown in FIGS. 3 and 4, an XY stage 33 includes an XY movable portion 34, and the XY movable portion 34 has, in its lower surface, a square hole 35 extending along the Z axis. A piezoelectric element 21 that expands and contracts along the Z axis in accordance with application of a voltage is fixed to the square hole 35. As a result, the center of gravity of the piezoelectric element 21 falls within the thickness (dimension along the Z axis) of the XY movable portion 34. That is, the center of gravity of the piezoelectric element 21 comes close to an X-Y plane passing through the center of gravity of the XY movable portion 34. In other words, the position of a cantilever 23 comes close to the X-Y plane passing through the center of gravity of the XY movable portion 34. A holder 22 for holding the cantilever 23 is attached to the free end of the piezoelectric element 21.

A light condensing portion 25 extends through the XY movable portion 34 and is held by the XY movable portion 34. The light condensing portion 25 is held so that its center of gravity falls within the thickness of the XY movable portion 34 in the Z direction, and desirably generally coincides with the X-Y plane passing through the center of gravity of the XY movable portion 34.

In the scanning mechanism 30 having this arrangement, the piezoelectric element 21 and light condensing portion 25 are arranged side by side along the X axis in projection to the X-Y plane. Further, both the centers of gravity of the piezoelectric element 21 and light condensing portion 25 fall within the thickness of the XY movable portion 34 in the Z direction. This reduces "swing vibrations of the XY movable portion 34 arising from an inertial force" generated when the XY movable portion 34 is scanned in the X and Y directions at high speed. Since the cantilever 23 comes close to the X-Y plane passing through the center of gravity of the XY movable portion 34, an increase in swing vibrations of the cantilever 23 is also prevented.

[Modification 1]

This scanning mechanism can be modified as follows. FIGS. 5 and 6 show a scanning mechanism 40 as a modification of the second embodiment. FIG. 5 is a plan view of the scanning mechanism 40 as the modification of the second embodiment. FIG. 6 is a sectional view of the scanning mechanism 40 taken along a line C-C in FIG. 5. In FIGS. 5 and 6, the same reference numerals as those shown in FIGS. 1 and 2 denote the same parts, and a detailed description thereof will not be repeated.

As shown in FIGS. 5 and 6, the scanning mechanism 40 includes an XY stage 43, and the XY stage 43 includes an XY movable portion 44. The scanning mechanism 40 also includes the piezoelectric element 21 held by the XY movable portion 44, the holder 22 held by the piezoelectric element 21, the cantilever 23 held by the holder 22, a piezoelectric element 41 held by the XY movable portion 44, and a pseudo holder 42 held by the piezoelectric element 41.

The piezoelectric element 21 has one end fixed to the XY movable portion 44, and extends in the −Z direction. The piezoelectric element 41 has one end fixed to the XY movable portion 44, and extends in the +Z direction. That is, the piezoelectric elements 21 and 41 extend from the XY movable portion 44 to opposite sides along the Z axis.

The piezoelectric elements 21 and 41 are constituted by, e.g., substantially identical laminated piezoelectric elements, and can expand and contract along the Z axis in accordance with application of a voltage. The piezoelectric elements 21 and 41 constitute a Z actuator to scan the cantilever 23 in the Z axis direction perpendicular to the X-Y plane.

The holder 22 for holding the cantilever 23 is attached to the free end of the piezoelectric element 21 arranged on the lower surface of the XY movable portion 44. That is, the cantilever 23 is held at the free end of the piezoelectric element 21. The pseudo holder 42, which is a member identical to the holder 22, is attached to the free end of the piezoelectric element 41 arranged on the upper surface of the XY movable portion 44. The pseudo holder 42 can be replaced with a member having the same mass as that of the holder 22.

When scanning the cantilever 23 in the Z direction, a Z driving signal is supplied from a Z piezoelectric driving unit, not shown to the two piezoelectric elements 21 and 41 to expand/contract the two piezoelectric elements 21 and 41 by the same amount in opposite directions. The expansion/contraction of the piezoelectric element 41 cancels a force along the Z axis that is applied to the XY movable portion 44 by the expansion/contraction of the piezoelectric element 21. Accordingly, vibrations of the XY movable portion 44 in the Z direction that are generated by the expansion/contraction of the piezoelectric element 21 are suppressed to be approximately 0.

In the scanning mechanism 40 having this arrangement, the two piezoelectric elements 21 and 41, and the light condensing portion 25 are arranged side by side along the X axis in projection to the X-Y plane. The light condensing portion 25 is held so that its center of gravity falls within the thickness of the XY movable portion 44 in the Z direction, and desirably generally coincides with an X-Y plane passing through the center of gravity of the XY movable portion 44. Since the two piezoelectric elements 21 and 41 have generally the same shape and same mass, the Z actuator constituted by the two piezoelectric elements 21 and 41 is held so that its center of gravity falls within the thickness of the XY movable portion 44 in the Z direction, and desirably generally coincides with the X-Y plane passing through the center of gravity of the XY movable portion 44. This reduces "swing vibrations of the XY movable portion 44 arising from an inertial force" generated when the XY movable portion 44 is scanned in the X and Y directions at high speed. Further, the Z actuator constituted by the two piezoelectric elements 21 and 41 becomes generally symmetrical with respect to the X-Y plane passing through the center of gravity of the XY movable portion 44. This acts as a counterbalance to cancel "swing vibrations of the XY movable portion 44 arising from an inertial force". Hence, "swing vibrations of the XY movable portion 44 arising from an inertial force" are further reduced. In addition, the Z actuator constituted by the two piezoelectric elements 21 and 41 suppresses, to be approximately 0, vibration noise generated when the cantilever 23 is scanned in the Z direction.

[Modification 2]

Figure 7:
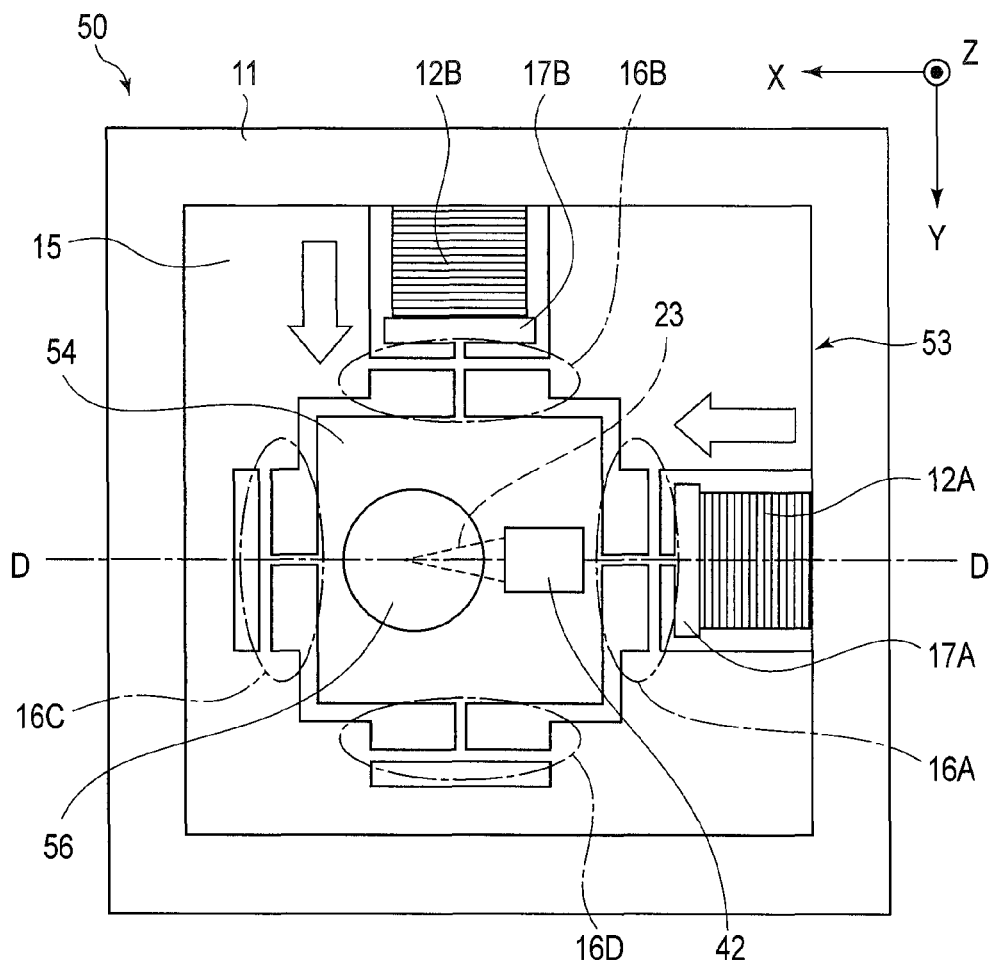
FIG. 7 is a plan view of a scanning mechanism as a modification of the second embodiment.
Figure 8:
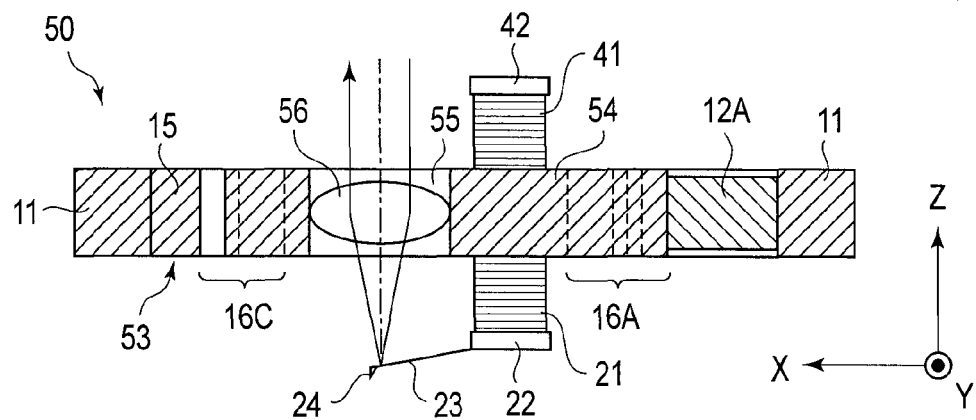
FIG. 8 is a sectional view of the scanning mechanism taken along a line D-D in FIG. 7.

This scanning mechanism can be further modified as follows. FIGS. 7 and 8 show a scanning mechanism 50 as a modification of the second embodiment. FIG. 7 is a plan view of the scanning mechanism 50 as the modification of the second embodiment. FIG. 8 is a sectional view of the scanning mechanism 50 taken along a line D-D in FIG. 7. In FIGS. 7 and 8, the same reference numerals as those shown in FIGS. 5 and 6 denote the same parts, and a detailed description thereof will not be repeated.

As shown in FIGS. 7 and 8, the scanning mechanism 50 includes an XY stage 53, and the XY stage 53 includes an XY movable portion 54. The scanning mechanism 50 also includes the piezoelectric element 21 held by the XY movable portion 54, the holder 22 held by the piezoelectric element 21, the cantilever 23 held by the holder 22, the piezoelectric element 41 held by the XY movable portion 54, and the pseudo holder 42 held by the piezoelectric element 41.

The scanning mechanism 50 further includes a single lens 56 held by the XY movable portion 54. The single lens 56 is arranged inside a through hole 55 formed in the XY movable portion 54, and falls within the thickness of the XY movable portion 54. The single lens 56 is desirably held so that its center of gravity generally coincides with an X-Y plane passing through the center of gravity of the XY movable portion 54. The single lens 56 has the same condensing characteristic as that of the light condensing portion 25 shown in FIG. 1. That is, the single lens 56 constitutes a light condensing portion to cause light for detecting the displacement of the cantilever 23 to enter the cantilever 23. For example, the single lens 56 has an optical characteristic in which the NA is equal to or higher than 0.4 so that light can be condensed even to a small cantilever 10 μm long and 2 μm wide. This is because the focus spot diameter is obtained by 1.22×wavelength/NA, and when, for example, a red laser with a wavelength of 650 nm is used for detection light of the optical lever sensor and the NA is 0.4, the focus spot diameter becomes approximately 2 μm. The diameter of the single lens 56 is desirably equal to or smaller than 10 mm. This is because it is important to reduce the size and weight of the XY movable portion 54 itself in order to increase the XY scanning speed.

In the scanning mechanism 50 having this arrangement, the two piezoelectric elements 21 and 41, and the single lens 56 are arranged side by side along the X axis in projection to the X-Y plane. The single lens 56 is held so that it falls within the XY movable portion 54, and desirably its center of gravity generally coincides with an X-Y plane passing through the center of gravity of the XY movable portion 54. Since the two piezoelectric elements 21 and 41 have generally the same shape and same mass, a Z actuator constituted by the two piezoelectric elements 21 and 41 is held so that its center of gravity generally coincides with the X-Y plane passing through the center of gravity of the XY movable portion 54. This reduces "swing vibrations of the XY movable portion 54 arising from an inertial force" generated when the XY movable portion 54 is scanned in the X and Y directions at high speed. Further, the Z actuator constituted by the two piezoelectric elements 21 and 41 becomes generally symmetrical with respect to the X-Y plane passing through the center of gravity of the XY movable portion 54. This acts as a counterbalance to cancel "swing vibrations of the XY movable portion 54 arising from an inertial force". As a result, "swing vibrations of the XY movable portion 54 arising from an inertial force" are further reduced. In addition, the Z actuator constituted by the two piezoelectric elements 21 and 41 suppresses, to be approximately 0, vibration noise generated when the cantilever 23 is scanned in the Z direction.

Since the light condensing portion is a small size, lightweight single lens, an inertial force applied to the light condensing portion is reduced. As a consequence, "swing vibrations of the XY movable portion 54 arising from an inertial force" are further reduced. The size and weight of the XY movable portion 54 itself can be reduced, and the resonance frequency of the scanning mechanism can be increased. This is effective for high speed scanning.

[Modification 3]

Figure 9:
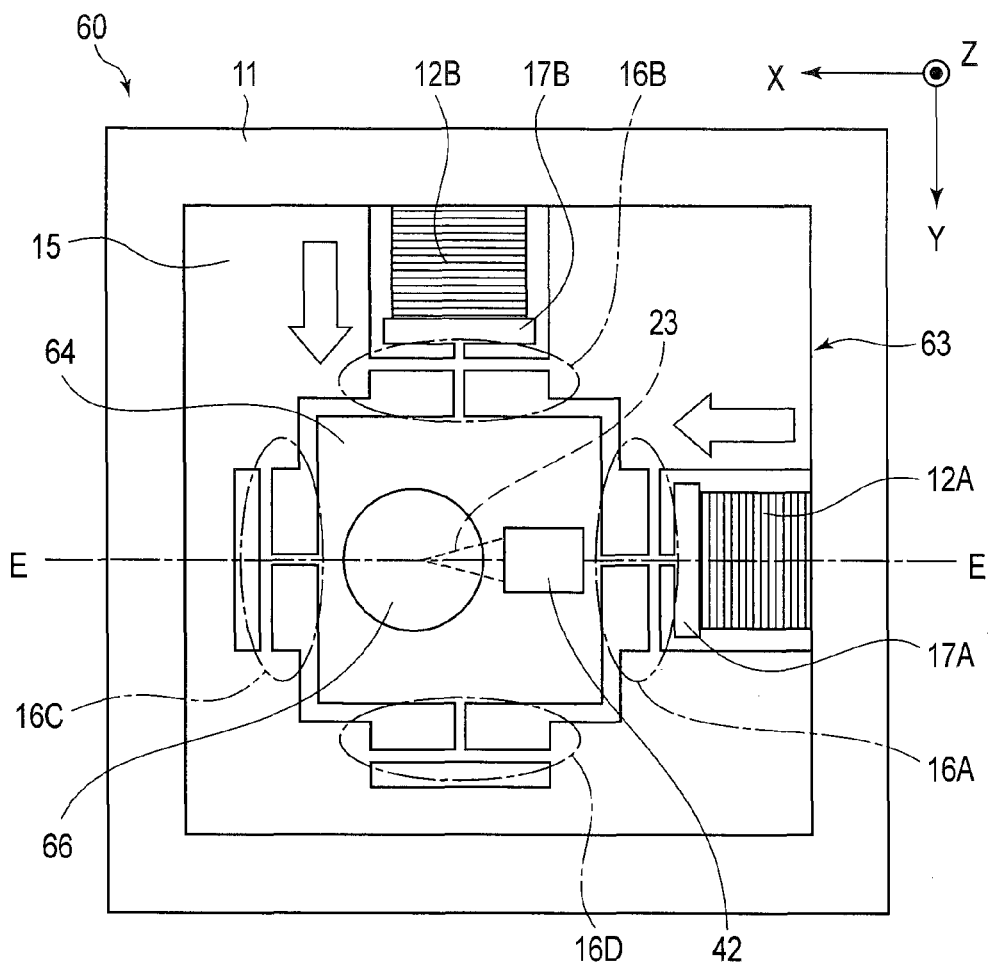
FIG. 9 is a plan view of a scanning mechanism as a modification of the second embodiment.
Figure 10:
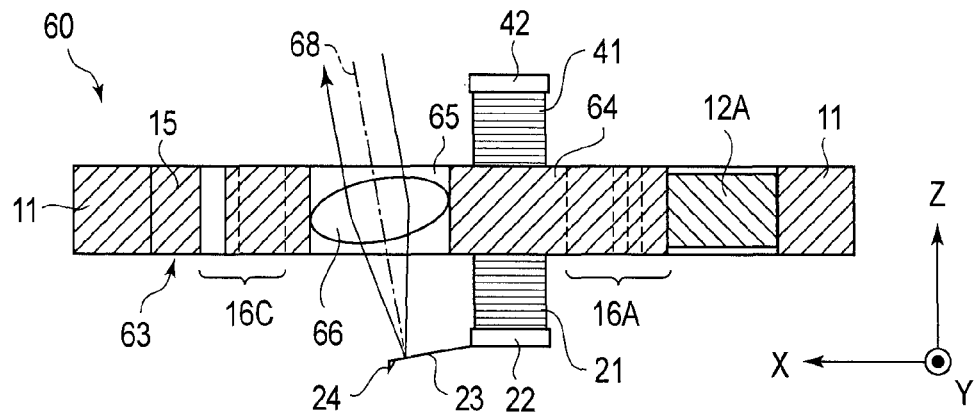
FIG. 10 is a sectional view of the scanning mechanism taken along a line E-E in FIG. 9.

This scanning mechanism can be modified as follows. FIGS. 9 and 10 show a scanning mechanism 60 as a modification of the second embodiment. FIG. 9 is a plan view of the scanning mechanism 60 as the modification of the second embodiment. FIG. 10 is a sectional view of the scanning mechanism 60 taken along a line E-E in FIG. 9. In FIGS. 9 and 10, the same reference numerals as those shown in FIGS. 7 and 8 denote the same parts, and a detailed description thereof will not be repeated.

As shown in FIGS. 9 and 10, the scanning mechanism 60 includes an XY stage 63, and the XY stage 63 includes an XY movable portion 64. The scanning mechanism 60 also includes the piezoelectric element 21 held by the XY movable portion 64, the holder 22 held by the piezoelectric element 21, the cantilever 23 held by the holder 22, the piezoelectric element 41 held by the XY movable portion 64, and the pseudo holder 42 held by the piezoelectric element 41.

The holder 22 for holding the cantilever 23 is attached to the free end of the piezoelectric element 21 arranged on the lower surface of the XY movable portion 64. The holder 22 holds the cantilever 23 at an inclination of 5 degrees to 20 degrees with respect to the X-Y plane. This is practiced in generally all AFMs in order to avoid interference between the lever surface of the cantilever 23 and a sample, not shown, arranged parallel to the X-Y plane. The pseudo holder 42, which is a member identical to the holder 22, is attached to the free end of the piezoelectric element 41 arranged on the upper surface of the XY movable portion 64. The pseudo holder 42 can be replaced with a member having the same mass as that of the holder 22.

The scanning mechanism 60 further includes a single lens 66 held by the XY movable portion 64. The single lens 66 is held with an optical axis 68 of the single lens 66 inclined at an angle of 5 degrees to 20 degrees with respect to an axis perpendicular to the X-Y plane so as to cause convergent light to enter the lever surface of the cantilever 23 perpendicularly. The single lens 66 is arranged inside a through hole 65 formed in the XY movable portion 64, and falls within the thickness of the XY movable portion 64. The single lens 66 is desirably held so that its center of gravity generally coincides with an X-Y plane passing through the center of gravity of the XY movable portion 64. The single lens 66 has an optical characteristic in which the NA is equal to or higher than 0.4 so that light can be condensed even to a small cantilever 10 μm long and 2 μm wide.

In the scanning mechanism 60 having this arrangement, the two piezoelectric elements 21 and 41, and the single lens 66 are arranged side by side along the X axis in projection to the X-Y plane. The single lens 66 is held so that its center of gravity generally coincides with an X-Y plane passing through the center of gravity of the XY movable portion 64. Since the two piezoelectric elements 21 and 41 have generally the same shape and same mass, a Z actuator constituted by the two piezoelectric elements 21 and 41 is held so that its center of gravity generally coincides with the X-Y plane passing through the center of gravity of the XY movable portion 64. This reduces "swing vibrations of the XY movable portion 64 arising from an inertial force" generated when the XY movable portion 64 is scanned in the X and Y directions at high speed. Further, the Z actuator constituted by the two piezoelectric elements 21 and 41 becomes generally symmetrical with respect to the X-Y plane passing through the center of gravity of the XY movable portion 64. This acts as a counterbalance to cancel "swing vibrations of the XY movable portion 64 arising from an inertial force". Thus, "swing vibrations of the XY movable portion 64 arising from an inertial force" are further reduced. In addition, the Z actuator constituted by the two piezoelectric elements 21 and 41 suppresses, to be approximately 0, vibration noise generated when the cantilever 23 is scanned in the Z direction. Since the optical axis 68 of the single lens 66 is inclined at an angle of 5 degrees to 20 degrees with respect to an axis perpendicular to the X-Y plane, it can cause convergent light to enter the cantilever 23 perpendicularly. The single lens 66 has an optical characteristic in which the NA is equal to or higher than 0.4. Therefore, the diameter of a convergent spot formed on the cantilever 23 can be decreased to approximately 2 μm. This is effective for improving the detection precision of displacement of the cantilever 23.

Third Embodiment

The third embodiment is directed to a scanning mechanism. The third embodiment will be described with reference to FIGS. 11, 12, and 13.

Figure 11:
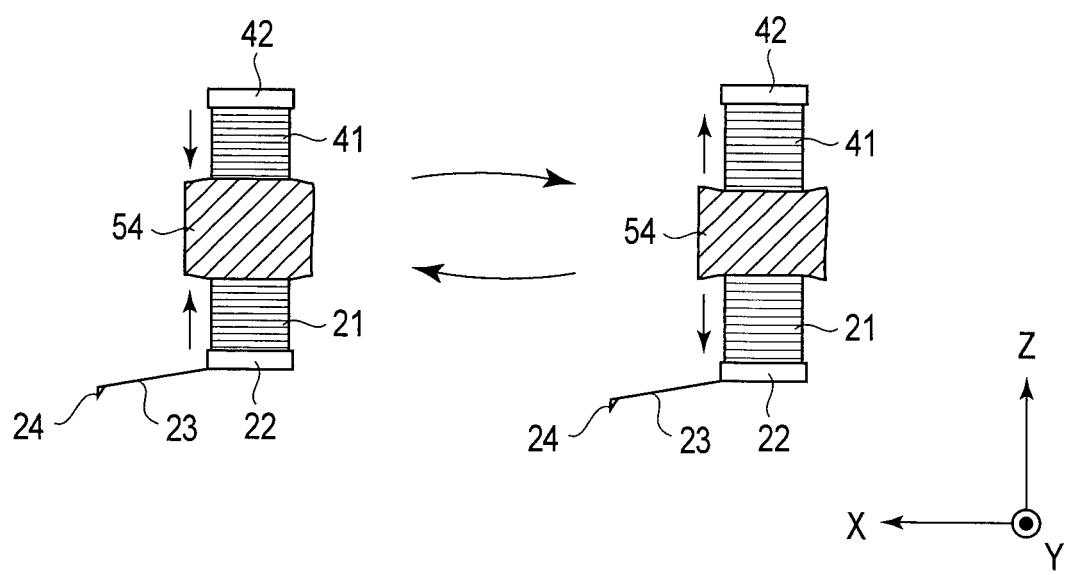
FIG. 11 shows a state in which the base of an XY movable portion is deformed by a shock of scanning.

Each of the scanning mechanisms 40, 50, and 60 described in the second embodiment includes the two piezoelectric elements 21 and 41 extending to opposite sides along the Z axis, and suppresses, to be approximately 0, vibration noise generated when the cantilever 23 is scanned in the Z direction. However, scanning in the Z direction reaches a maximum of 100 kHz or higher, so there is a problem in which the base of the XY movable portion supporting the two piezoelectric elements 21 and 41 is deformed by a shock of scanning. FIG. 11 shows a state in which the base of the XY movable portion 54 is deformed when the scanning mechanism 50 is exemplified. This deformation acts as vibration noise of a maximum of 100 kHz or higher, and propagates to the light condensing portion (single lens 56 in the scanning mechanism 50). The light condensing portion is held at only its periphery by the XY movable portion, and is not robust to vibration noise. The light condensing portion therefore vibrates with respect to the XY movable portion. This hinders the improvement of the AFM observation precision.

FIG. 12 is a plan view of a scanning mechanism 70 according to the third embodiment that solves the above problem. FIG. 13 is a sectional view of the scanning mechanism 70 taken along a line F-F in FIG. 12. In FIGS. 12 and 13, the same reference numerals as those shown in FIGS. 7 and 8 denote the same parts, and a detailed description thereof will not be repeated.

As shown in FIGS. 12 and 13, the scanning mechanism 70 includes an XY stage 73, and the XY stage 73 includes an XY movable portion 74. The scanning mechanism 70 also includes a piezoelectric element 21 held by the XY movable portion 74, a holder 22 held by the piezoelectric element 21, a cantilever 23 held by the holder 22, a piezoelectric element 41 held by the XY movable portion 74, a pseudo holder 42 held by the piezoelectric element 41, and a single lens 76 held by the XY movable portion 74. The single lens 76 is arranged inside a through hole 75 formed in the XY movable portion 74, and falls within the thickness of the XY movable portion 74. The single lens 76 is desirably held so that its center of gravity generally coincides with an X-Y plane passing through the center of gravity of the XY movable portion 74.

The single lens 76 arranged at the XY movable portion 74, and a Z actuator constituted by the two piezoelectric elements 21 and 41 are arranged side by side along the X axis in projection to the X-Y plane. An opening 77 extending through the XY movable portion 74 is formed between the single lens 76, and the Z actuator constituted by the two piezoelectric elements 21 and 41, so as to mechanically separate them.

In the scanning mechanism 70 having this arrangement, the opening 77 is formed between the two piezoelectric elements 21 and 41, and the single lens 76 to mechanically separate them. This reduces transfer, to the single lens 76, of vibration noise generated upon scanning in the Z direction.

[Modification]

Figure 14:
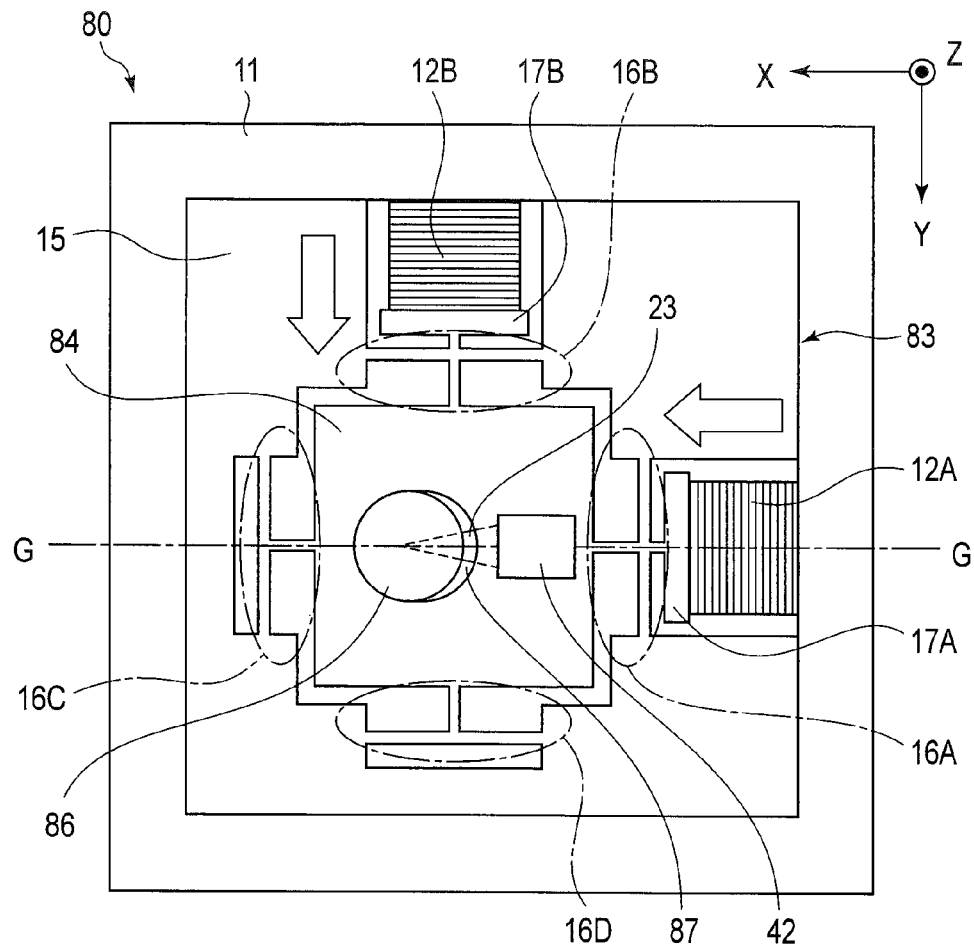
FIG. 14 is a plan view of a scanning mechanism as a modification of the third embodiment.
Figure 15:
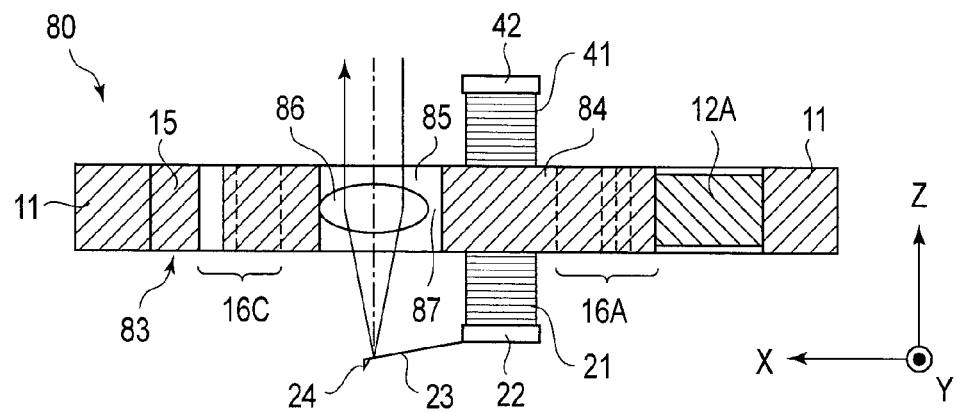
FIG. 15 is a sectional view of the scanning mechanism taken along a line G-G in FIG. 14.

This scanning mechanism can be modified as follows. FIGS. 14 and 15 show a scanning mechanism 80 as a modification of the third embodiment. FIG. 14 is a plan view of the scanning mechanism 80 as the modification of the third embodiment. FIG. 15 is a sectional view of the scanning mechanism 80 taken along a line G-G in FIG. 14. In FIGS. 14 and 15, the same reference numerals as those shown in FIGS. 12 and 13 denote the same parts, and a detailed description thereof will not be repeated.

As shown in FIGS. 14 and 15, the scanning mechanism 80 includes an XY stage 83, and the XY stage 83 includes an XY movable portion 84. The scanning mechanism 80 also includes the piezoelectric element 21 held by the XY movable portion 84, the holder 22 held by the piezoelectric element 21, the cantilever 23 held by the holder 22, the piezoelectric element 41 held by the XY movable portion 84, the pseudo holder 42 held by the piezoelectric element 41, and a single lens 86 held by the XY movable portion 84.

The single lens 86 is arranged inside a through hole 85 formed in the XY movable portion 84. The through hole 85 formed in the XY movable portion 84 to hold the single lens 86 has an elliptical or oval shape obtained by slightly expanding the outer shape (circle) of the single lens 86. In the through hole 85, the single lens 86 is held at a position spaced apart from the two piezoelectric elements 21 and 41. More specifically, the single lens 86 is held so that part, e.g., half or ¾ of the periphery of the single lens 86 is joined to the through hole 85, and the remaining periphery does not contact the through hole 85. As a result, a gap, i.e., an opening 87 is formed between a portion of the single lens 86 that is closest to the two piezoelectric elements 21 and 41, and the XY movable portion 84. The opening 87 mechanically separates the single lens 86 and XY movable portion 84. Further, the single lens 86 is held so that it falls within the thickness of the XY movable portion 84, and desirably its center of gravity generally coincides with an X-Y plane passing through the center of gravity of the XY movable portion 84.

In the scanning mechanism 80 having this arrangement, the opening 87 is formed between the two piezoelectric elements 21 and 41, and the single lens 86 so as to mechanically separate them. Further, the single lens 86 is held at a position spaced apart from the two piezoelectric elements 21 and 41. Therefore, the single lens 86 is completely mechanically separated from the base of the XY movable portion 84 holding the two piezoelectric elements 21 and 41. This further reduces transfer, to the single lens 86, of vibration noise generated upon scanning in the Z direction.

Figure 16:
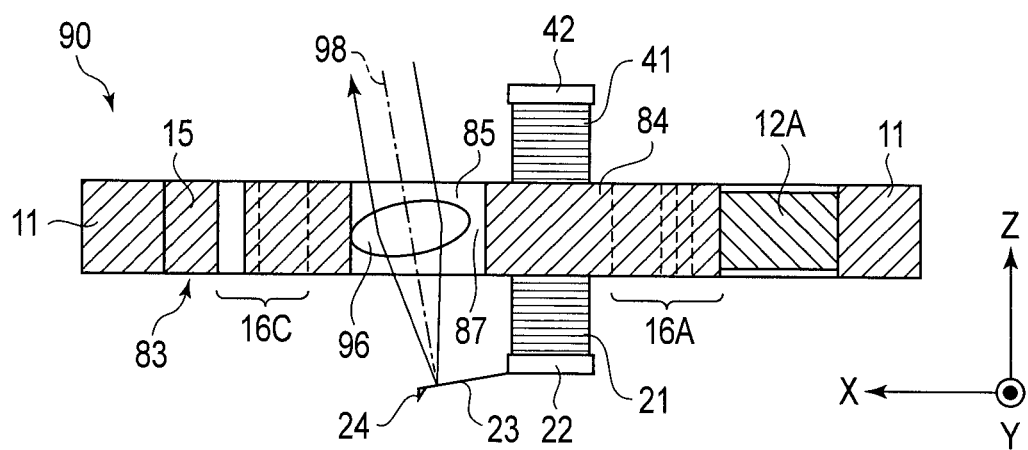
FIG. 16 is a sectional view of a scanning mechanism as a modification of the modification of the third embodiment.

FIG. 16 shows another modification of the third embodiment. A scanning mechanism 90 shown in FIG. 16 is identical to the scanning mechanism 80 except for the arrangement of a single lens 96. The single lens 96 may be held so that an optical axis 98 of the single lens 96 is inclined at an angle of 5 degrees to 20 degrees with respect to an axis perpendicular to the X-Y plane. Even this arrangement can obtain the same effects for reduction of transfer of vibration noise to the single lens 96.

Fourth Embodiment

The fourth embodiment is directed to a scanning probe microscope including the scanning mechanism according to the second embodiment. The fourth embodiment will be explained with reference to FIG. 17. FIG. 17 shows a scanning probe microscope 100 according to the fourth embodiment.

As shown in FIG. 17, the scanning probe microscope 100 according to the fourth embodiment includes a scanning mechanism 50 holding a cantilever 23, a host computer 101, a controller 102 including a Z control unit 103, a laser source 111, a multi-segments detector 112, a Z piezoelectric driver 106, and an XY piezoelectric driver 107. A sample 116 set on a sample mount 117 is arranged at a position facing the cantilever 23.

The scanning mechanism 50 is for scanning the cantilever 23 along the X, Y, and Z axes, and has a detailed arrangement as described in the second embodiment (FIGS. 7 and 8). The scanning mechanism 50 is held by a lens frame, not shown.

The cantilever 23 includes, at the free end of a flexible lever portion, a probe arranged to face the sample 116. The cantilever 23 is displaced along the Z axis in accordance with interaction with the sample 116.

The laser source 111 and multi-segments detector 112 constitute an optical displacement sensor for optically detecting the displacement of the free end of the cantilever 23 along the Z axis, and are held by a lens frame, not shown.

The Z piezoelectric driver 106 is for driving two piezoelectric elements 21 and 41 mounted in the scanning mechanism 50.

The XY piezoelectric driver 107 is for driving piezoelectric elements 12A and 12B mounted in the scanning mechanism 50.

The controller 102 is for controlling the Z piezoelectric driver 106 and XY piezoelectric driver 107.

The host computer 101 constitutes a processing unit to acquire physical information of the sample 116 based on displacement information of the cantilever 23 and scanning information of the scanning mechanism 50.

The scanning probe microscope according to the fourth embodiment operates as follows.

The optical displacement sensor constituted by the laser source 111 and multi-segments detector 112 is, e.g., an optical lever sensor, which is often used in a scanning probe microscope. A collimated laser beam 113 emitted by the laser source 111 forms a condensed spot having a diameter of several μm on the cantilever 23 through a single lens 56 arranged in the scanning mechanism 50. The multi-segments detector 112 receives the reflected light to detect the Z displacement of a mechanical probe 24 at the free end of the cantilever 23. The multi-segments detector 112 outputs, to the controller 102, a displacement signal reflecting the Z displacement of the cantilever 23.

The controller 102 generates an XY scanning signal for raster scanning in the X and Y directions, and supplies the XY scanning signal to the XY piezoelectric driver 107 and host computer 101. The controller 102 includes the Z control unit 103. The Z control unit 103 generates a Z scanning signal for controlling the Z piezoelectric driver 106 so that displacement information of the cantilever 23 obtained by the multi-segments detector 112 is kept constant. The Z control unit 103 supplies the Z scanning signal to the Z piezoelectric driver 106 and host computer 101.

The Z piezoelectric driver 106 amplifies, by a predetermined gain, the Z scanning signal supplied from the controller 102, thereby generating a Z driving signal. The Z piezoelectric driver 106 supplies the Z driving signal to the two piezoelectric elements 21 and 41 mounted in the scanning mechanism 50.

The XY piezoelectric driver 107 amplifies, by a predetermined gain, the XY scanning signal supplied from the controller 102, thereby generating an XY driving signal. The XY piezoelectric driver 107 supplies the XY driving signal to the piezoelectric elements 12A and 12B mounted in the scanning mechanism 50. More specifically, the XY piezoelectric driver 107 supplies, to the piezoelectric element 12A, an X driving signal generated by amplifying an X scanning signal supplied from the controller 102, and supplies, to the piezoelectric element 12B, a Y driving signal generated by amplifying a Y scanning signal supplied from the controller 102.

The host computer 101 constructs the three dimensional image of the surface shape of the sample 116 based on the XY scanning signal and Z scanning signal supplied from the controller 102. The host computer 101 displays the three dimensional image on a monitor.

The scanning probe microscope 100 performs high speed scanning in the X and Y directions at high precision by using the scanning mechanism 50. According to the scanning probe microscope 100, the observation resolution is improved and the observation time is shortened.

[Modification]

Figure 18:
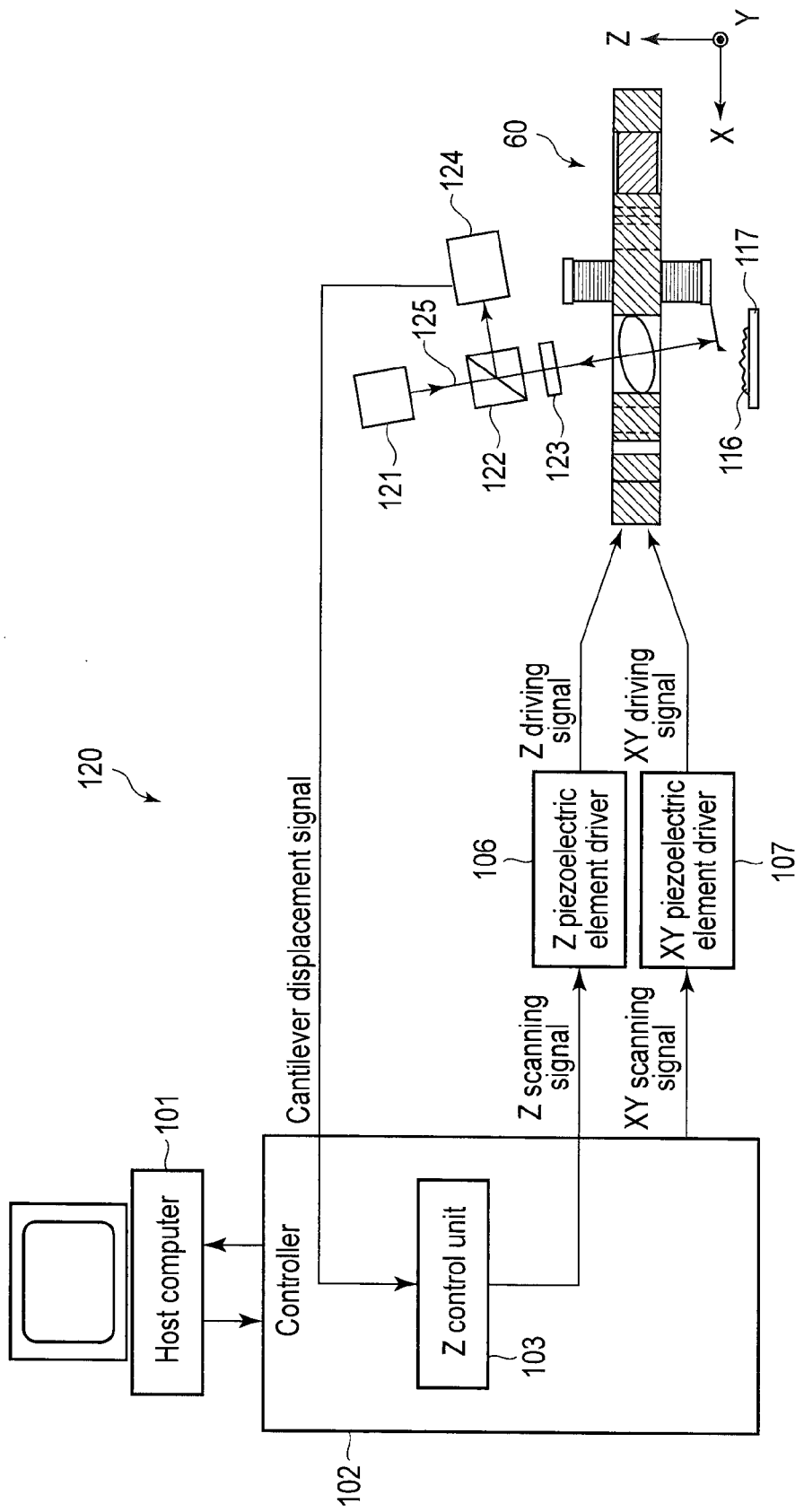
FIG. 18 shows a scanning probe microscope as a modification of the fourth embodiment.

This scanning probe microscope can be modified as follows. FIG. 18 shows a scanning probe microscope 120 as a modification of the fourth embodiment. In FIG. 18, the same reference numerals as those shown in FIG. 17 denote the same parts, and a detailed description thereof will not be repeated.

The scanning probe microscope 120 shown in FIG. 18 is constituted by replacing the scanning mechanism 50 shown in FIG. 17 with a scanning mechanism 60. Further, the scanning probe microscope 120 includes a laser source 121, a beam splitter 122, a wave plate 123, and a multi-segments detector 124.

The laser source 121, beam splitter 122, wave plate 123, and multi-segments detector 124 constitute an optical displacement sensor for optically detecting the displacement of the free end of the cantilever 23 along the Z axis, and are held by a lens frame, not shown. The optical displacement sensor constituted by these components is, e.g., an optical lever sensor, which is often used in a scanning probe microscope. A collimated laser beam 125 emitted by the laser source 121 is applied, through the beam splitter 122 and wave plate 123, to the single lens 66 arranged in the scanning mechanism 60, and forms a condensed spot having a diameter of approximately 2 μm on the cantilever 23. The reflected light passes through the wave plate 123, is deflected by the beam splitter 122, and enters the multi-segments detector 124. The multi-segments detector 124 outputs, to the controller 102, a displacement signal reflecting the Z displacement of the cantilever 23.

The scanning probe microscope 120 performs high speed scanning in the X and Y directions at high precision by using the scanning mechanism 60. According to the scanning probe microscope 120, the observation resolution is improved and the observation time is shortened. According to the scanning probe microscope 120, the diameter of a condensed spot applied to the cantilever by the scanning mechanism 60 can be decreased to a diameter of approximately 2 μm. This is effective for improving the detection precision of displacement of the cantilever 23. The scanning probe microscope 120 allows observing a sample at higher precision.

Fifth Embodiment

The fifth embodiment is directed to a scanning probe microscope including the scanning mechanism according to the second embodiment. The fifth embodiment will be explained with reference to FIG. 19. FIG. 19 shows a scanning probe microscope 130 according to the fifth embodiment. In FIG. 19, the same reference numerals as those shown in FIG. 18 denote the same parts, and a detailed description thereof will not be repeated.

The scanning probe microscope 130 shown in FIG. 19 includes a laser source 131 to emit a collimated laser beam 136, a beam splitter 132, a wave plate 133, a half mirror 135, a multi-segments detector 134, an objective lens 141, an illumination light source 142 to emit illumination light 144, and a condensing lens 143 to condense the illumination light 144.

The laser source 131, beam splitter 132, wave plate 133, multi-segments detector 134, and half mirror 135 constitute an optical displacement sensor for optically detecting the displacement of the free end of a cantilever 23 along the Z axis, and are held by a lens frame, not shown. The displacement sensor constituted by these components is, e.g., an optical lever displacement sensor, which is often used in a scanning probe microscope. The collimated laser beam 136 emitted by the laser source 131 is applied, through the beam splitter 132, wave plate 133, and half mirror 135, to a single lens 66 arranged in a scanning mechanism 60, and forms a condensed spot having a diameter of approximately 2 μm on the cantilever 23. The reflected light passes through the single lens 66, half mirror 135, and wave plate 133, and is reflected by the beam splitter 132 toward the multi-segments detector 134. The multi-segments detector 134 outputs, to a controller 102, a displacement signal reflecting the Z displacement of the cantilever 23.

The illumination light 144 emitted by the illumination light source 142 is applied to the sample 116 through the condensing lens 143, half mirror 135, and single lens 66, and enters the objective lens 141. The inverted optical microscope implements transmission observation of the sample 116.

The scanning probe microscope 130 performs high speed scanning in the X and Y directions at high precision by using the scanning mechanism 60. According to the scanning probe microscope 130, the observation resolution is improved and the observation time is shortened.

According to the scanning probe microscope 130, the diameter of a condensed spot applied to the cantilever by the scanning mechanism 60 can be decreased to a diameter of approximately 2 μm. This is effective for improving the detection precision of displacement of the cantilever 23. The scanning probe microscope 130 allows observing a sample at higher precision.

Further, the scanning probe microscope 130 enables transmission observation of the sample 116 by the inverted optical microscope. This leads to the improvement of operability such as observation positioning of the sample 116.

Although several embodiments of the present invention have been explained above with reference to the drawings, these embodiments are not intended to limit the scope of the invention. Various modifications and changes may be made without departing from the spirit of the invention. These modifications and changes include even the practice of a proper combination of the embodiments described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scanning mechanism comprising:
   a cantilever;
   an XY movable portion movable in X and Y directions parallel to an X-Y plane;
   an XY actuator to scan the XY movable portion in the X and Y directions;
   a Z actuator, held by the XY movable portion, to scan the cantilever in a Z direction perpendicular to the X-Y plane; and
   a light condensing portion, held by the XY movable portion, to cause light for detecting a displacement of the cantilever to enter the cantilever,
   in projection to the X-Y plane, at least part of the Z actuator being not overlapped with the light condensing portion.

2. The scanning mechanism according to claim 1, wherein the Z actuator includes at least one piezoelectric element, the piezoelectric element and the light condensing portion are arranged so as not to be overlapped with each other in projection to the X-Y plane.

3. The scanning mechanism according to claim 1, wherein both a center of gravity of the Z actuator and a center of gravity of the light condensing portion fall within a thickness of the XY movable portion.

4. The scanning mechanism according to claim 3, wherein the Z actuator includes two, substantially identical laminated piezoelectric elements to expand and contract along a Z axis, and the two laminated piezoelectric elements extend from the XY movable portion to opposite sides along the Z axis, respectively.

5. The scanning mechanism according to claim 4, wherein a holder to hold the cantilever is held at a free end of one of the two laminated piezoelectric elements, and a pseudo holder substantially equal in mass to the holder is held at a free end of the other one of the two laminated piezoelectric elements.

6. The scanning mechanism according to claim 1, wherein the light condensing portion comprises a unit including at least one lens.

7. The scanning mechanism according to claim 6, wherein the unit comprises a single lens.

8. The scanning mechanism according to claim 7, wherein the cantilever is held so as to form an angle of 5 degrees to 20 degrees with respect to the X-Y plane, and
   the single lens is held by the XY movable portion with an angle of 5 degrees to 20 degrees by an optical axis of the single lens with respect to the Z axis.

9. The scanning mechanism according to claim 7, wherein the single lens has a diameter of not larger than 10 mm.

10. The scanning mechanism according to claim 7, wherein the single lens has a NA of not lower than 0.4.

11. The scanning mechanism according to claim 1, wherein the XY movable portion has a vibration reducing part, arranged between the Z actuator and the light condensing portion, to reduce transfer of vibration between the Z actuator and the light condensing portion.

12. The scanning mechanism according to claim 11, wherein the vibration reducing part is formed so as to be in contact with at least part of a periphery of the light condensing portion that is closest to the Z actuator, and the XY movable portion.

13. The scanning mechanism according to claim 11, wherein the Z actuator includes two, substantially identical laminated piezoelectric elements to expand and contract along a Z axis, and the two laminated piezoelectric elements extend from the XY movable portion to opposite sides along the Z axis, respectively.

14. The scanning mechanism according to claim 13, wherein a holder to hold the cantilever is held at a free end of one of the two laminated piezoelectric elements, and a pseudo holder substantially equal in mass to the holder and the cantilever is held at a free end of the other one of the two laminated piezoelectric elements.

15. The scanning mechanism according to claim 11, wherein the light condensing portion comprises a unit including at least one lens.

16. The scanning mechanism according to claim 15, wherein the unit comprises a single lens.

17. The scanning mechanism according to claim 16, wherein
the cantilever is held so as to form an angle of 5 degrees to 20 degrees with respect to the X-Y plane, and
the single lens is held by the XY movable portion with an angle of 5 degrees to 20 degrees by an optical axis of the single lens with respect to the Z axis.

18. The scanning mechanism according to claim 16, wherein the single lens has a diameter of not larger than 10 mm.

19. The scanning mechanism according to claim 16, wherein the single lens has a NA of not lower than 0.4.

20. The scanning mechanism according to claim 11, wherein the vibration reducing part comprises an opening.

21. The scanning mechanism according to claim 1, wherein the light condensing portion changes light for detecting the displacement of the cantilever held by the XY movable portion into convergent light and causes the convergent light to enter the cantilever.

22. A scanning probe microscope comprising a scanning mechanism defined by claim 1.

23. The scanning probe microscope according to claim 22, comprising an inverted optical microscope.

24. The scanning probe microscope according to claim 23, wherein the scanning probe microscope comprises an illumination light source for an optical microscope and an objective lens for the optical microscope, and illumination light emitted from the illumination light source is applied to a sample through the light condensing portion, so that transmission observation of the sample is performed.

* * * * *